(12) United States Patent
Takaoka et al.

(10) Patent No.: US 11,221,692 B2
(45) Date of Patent: Jan. 11, 2022

(54) KNOB AND INPUT DEVICE

(71) Applicant: Mitsubishi Electric Corporation, Tokyo (JP)

(72) Inventors: Shinya Takaoka, Tokyo (JP); Akinori Tsukaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 4 days.

(21) Appl. No.: 16/650,237

(22) PCT Filed: Oct. 11, 2017

(86) PCT No.: PCT/JP2017/036775
§ 371 (c)(1),
(2) Date: Mar. 24, 2020

(87) PCT Pub. No.: WO2019/073542
PCT Pub. Date: Apr. 18, 2019

(65) Prior Publication Data
US 2021/0200337 A1 Jul. 1, 2021

(51) Int. Cl.
*G06F 3/039* (2013.01)
*G06F 3/0362* (2013.01)
*G06F 3/044* (2006.01)

(52) U.S. Cl.
CPC .......... *G06F 3/0393* (2019.05); *G06F 3/0362* (2013.01); *G06F 3/044* (2013.01)

(58) Field of Classification Search
None
See application file for complete search history.

(56) References Cited

U.S. PATENT DOCUMENTS

2008/0238879 A1* 10/2008 Jaeger .................. G06F 3/0383
345/173
2015/0378480 A1* 12/2015 Craig .................... G06F 3/0393
345/174
(Continued)

FOREIGN PATENT DOCUMENTS

| JP | 2016-45525 A | 4/2016 |
| WO | WO 2016/041683 A1 | 3/2016 |

OTHER PUBLICATIONS

German Office Action for German Application No. 112017007885.7, dated Jan. 11, 2021, with English translation.

*Primary Examiner* — Amare Mengistu
*Assistant Examiner* — Sarvesh J Nadkarni
(74) *Attorney, Agent, or Firm* — Birch, Stewart, Kolasch & Birch, LLP

(57) ABSTRACT

It includes a knob including: an operation portion comprised of a ring-shaped conductive material, a rotational operation being performed on the operation portion; a rotary supporting member comprised of a ring-shaped non-conductive material and fixed onto a capacitive type touch panel, for rotatably supporting the operation portion; a ring-shaped concave groove disposed in the rotary supporting member; and a conductive conducting terminal portion electrically connected to the operation portion and rotating inside the concave groove integrally with the operation portion, the position of the conducting terminal portion being detected by the touch panel, wherein the conducting terminal portion is comprised of a plurality of conducting terminal portions, surfaces of the conducting terminal portions being in contact with the concave groove, at least two of the surfaces of the conducting terminal portions being different in contact area from each other.

4 Claims, 4 Drawing Sheets

(56) References Cited

U.S. PATENT DOCUMENTS

| | | | | |
|---|---|---|---|---|
| 2017/0182890 | A1* | 6/2017 | Ruemelin | G06F 3/04847 |
| 2017/0316901 | A1* | 11/2017 | Sawada | H01H 15/06 |
| 2019/0012003 | A1* | 1/2019 | Grant | G06F 3/041 |
| 2020/0089337 | A1* | 3/2020 | Togashi | G06F 3/0202 |
| 2020/0278761 | A1* | 9/2020 | Takaoka | G06F 3/0412 |

* cited by examiner

KNOB AND INPUT DEVICE

TECHNICAL FIELD

The present invention relates to a knob for operating a touch panel, and an input device in which the knob is fixed to the touch panel.

BACKGROUND ART

In recent years, many displays each with a capacitive type touch panel (hereinafter each referred to as "touch panel-equipped display") have been adopted for navigation devices, audio devices, center displays, and so on which are mounted in vehicles. Since each touch panel-equipped display does not have an uneven shape on a surface thereof, touch panel-equipped displays cannot be operated unless they are being visually recognized.

Patent Literature 1 discloses an input device in which a knob is fixed to a touch panel-equipped display in order to improve the ease of operation of the touch panel-equipped display. The knob includes a gripping portion for allowing a user to perform an operation, and a terminal portion that serves as a contact surface for the touch panel. When the user's finger touches the gripping portion, current flows through the terminal portion via the gripping portion, and the capacitance of the touch panel changes depending on the current. The touch panel detects a touch of a finger on the basis of the difference between the capacitance at the time of non-touch of any finger and the capacitance at the time of the touch of the finger.

CITATION LIST

Patent Literature

Patent Literature 1: JP 2016-45525 A

SUMMARY OF INVENTION

Technical Problem

A problem with the input device disclosed in Patent Literature 1 is that when the difference between the capacitance at the time of non-touch of any finger and the capacitance at the time of a touch of a finger is small, non-detection or erroneous detection of a touch of a finger on the knob occurs.

The present invention is made in order to solve the above-mentioned problem, and it is therefore an object of the present invention to provide a technique for preventing the occurrence of non-detection and erroneous detection of a touch of a finger on a knob.

Solution to Problem

According to the present invention, there is provided a knob including: an operation portion comprised of a ring-shaped conductive member, a rotational operation being performed on the operation portion; a rotary supporting member comprised of a ring-shaped non-conductive member and fixed onto a capacitive type touch panel, the rotary supporting member rotatably supporting the operation portion; a ring-shaped concave groove disposed in the rotary supporting member; and a conductive conducting terminal portion electrically connected to the operation portion, the conducting terminal portion being rotated inside the concave groove integrally with the operation portion, and a position of the conducting terminal portion being detected by the touch panel, wherein the conducting terminal portion is comprised of a plurality of conducting terminal portions, and at least two of the conducting terminal portions differ from each other in the areas of their surfaces in contact with the concave groove.

Advantageous Effects of Invention

According to the present invention, the occurrence of non-detection and erroneous detection of a touch of a finger on the knob can be prevented.

DESCRIPTION OF EMBODIMENTS

Hereinafter, in order to explain the present invention in greater detail, one embodiment of the present invention will be described with reference to the accompanying drawings.

Embodiment 1

Figure 1:
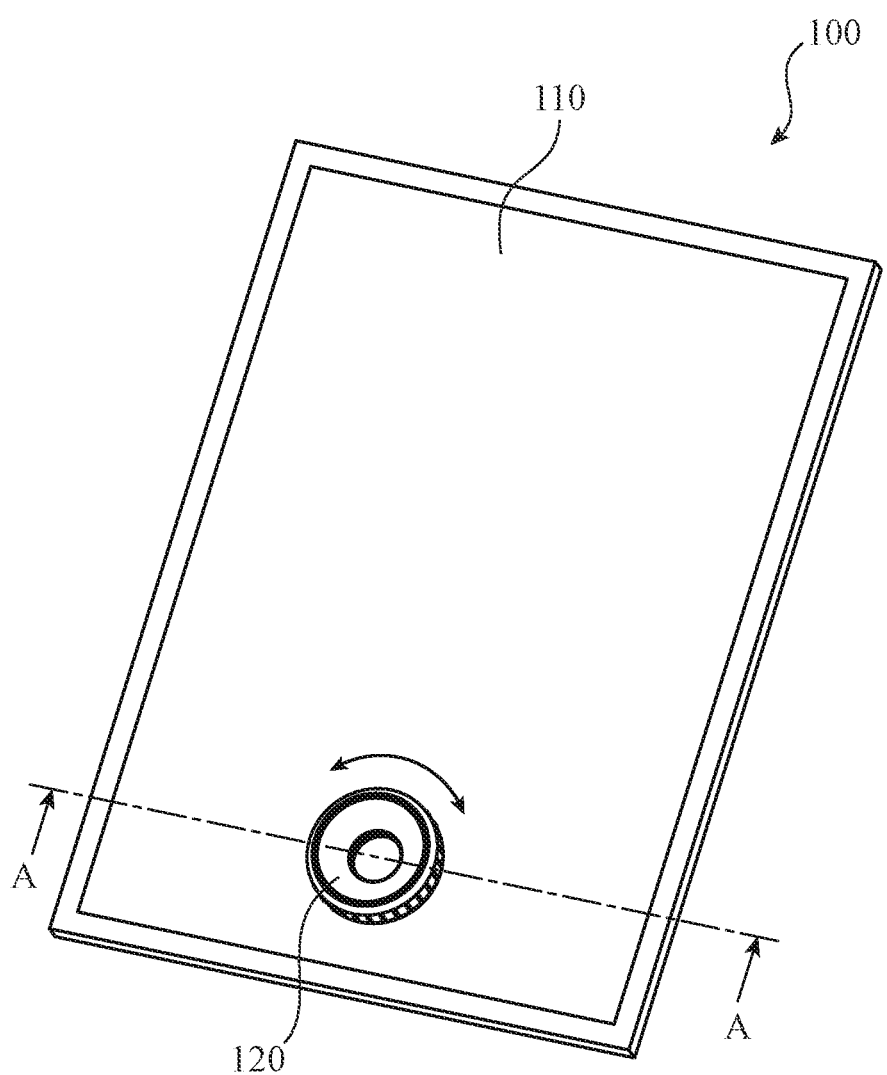
FIG. 1 is a perspective view of an input device according to an embodiment 1.

FIG. 1 is a perspective view of an input device 100 according to the embodiment 1.

The input device 100 includes a touch panel-equipped display 110 and a knob 120. The touch panel-equipped display 110 includes a capacitive type touch panel 111 (hereinafter referred to as "touch panel 111"), and a display (not illustrated). The display is integral with the touch panel 111.

The knob 120 is fixed onto the touch panel 111. The knob 120 is shaped like a ring. The knob 120 is constructed in such a way as to be rotatable in a direction of a double-headed arrow shown in FIG. 1. Since the touch panel 111 is exposed inside a ring in the knob 120, information displayed on the display can be visually recognized.

Figure 2:
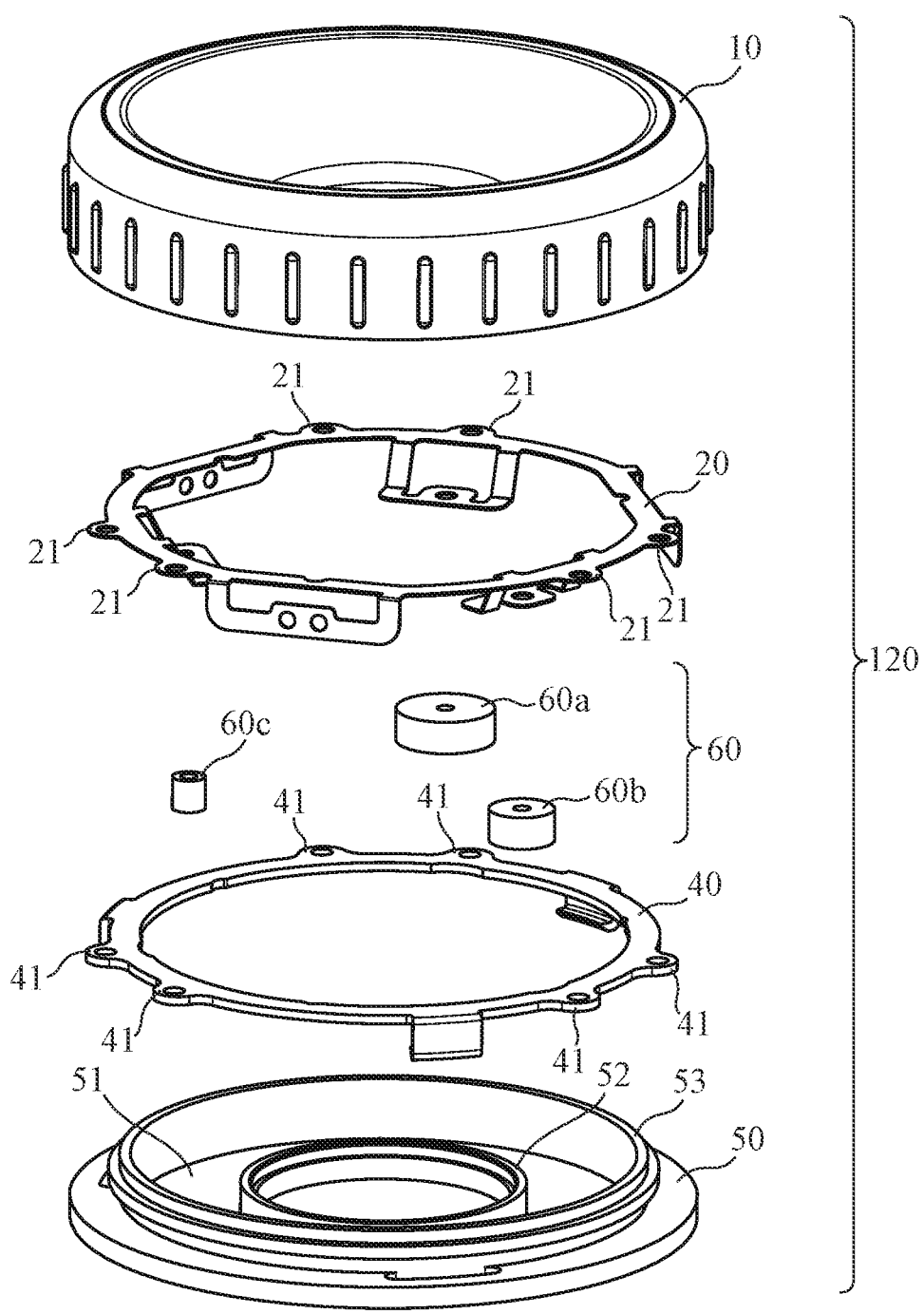
FIG. 2 is an exploded view of a knob according to the embodiment 1.

FIG. 2 is an exploded view of the knob 120 according to the embodiment 1.

The knob 120 mainly includes an operation portion 10, a conductive connecting member 20, conducting terminal portions 60, a rotary member 40, and a rotary supporting member 50.

Figure 3:
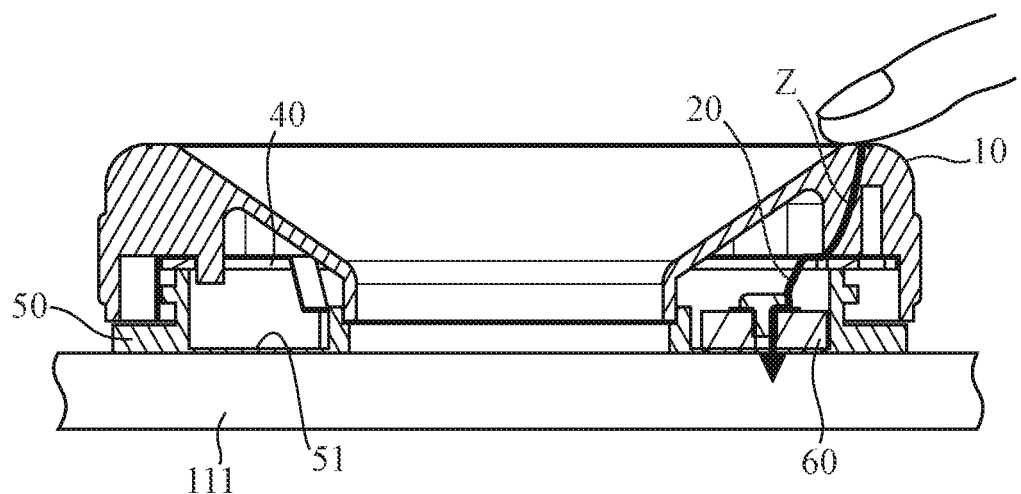
FIG. 3 is a cross-sectional view of an input device, taken along the line A-A shown in FIG. 1.

FIG. 3 is a cross-sectional view of the input device 100, taken along the line A-A shown in FIG. 1.

The operation portion 10 is a ring-shaped part. The operation portion 10 is a part on which a rotational operation is performed. The operation portion 10 is comprised of a conductive member. The operation portion 10 is a part in which, for example, conductive coating or plating treatment is applied to a resin such as ABS.

The rotary supporting member 50 is a ring-shaped part. The rotary supporting member 50 is comprised of a non-conductive material. For example, the rotary supporting member 50 is comprised of a resin such as ABS. The rotary supporting member 50 is fixed onto the touch panel 111. This fixation is, for example, adhesion. The rotary supporting member 50 rotatably supports the operation portion 10.

As shown in FIG. 2, the rotary supporting member 50 has a ring-shaped concave groove 51. The concave groove 51 is formed of a first wall portion 52 erected on an inner periphery side, and a second wall portion 53 erected on an outer periphery side of the first wall portion 52. A bottom surface of the concave groove 51 is formed in such a way that its thickness is reduced. The reduced thickness is, for example, 0.3 mm.

As shown in FIG. 2, the conductive connecting member 20, the conducting terminal portions 60, and the rotary member 40 are contained between the operation portion 10 and the rotary supporting member 50.

The conductive connecting member 20 is a ring-shaped part. The conductive connecting member 20 is comprised of a conductive material. For example, the conductive connecting member 20 is comprised of stainless steel.

Figure 4:
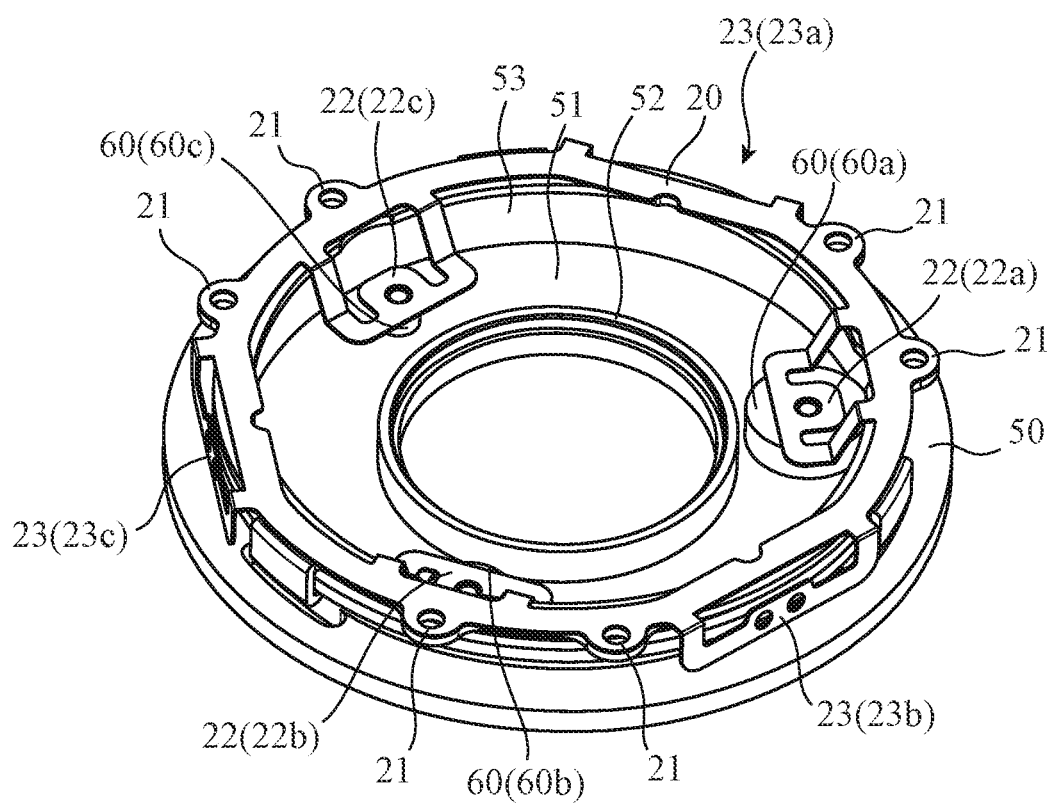
FIG. 4 is a perspective view of the knob (an operation portion is not illustrated)

FIG. 4 is a perspective view of the knob 120 according to the embodiment 1 (the operation portion 10 is not illustrated).

A plurality of conductive connecting member flange portions 21 are formed in the conductive connecting member 20. Each conductive connecting member flange portion 21 has a shape projecting outwardly in a radial direction. A hole via which a screw is inserted is formed in each conductive connecting member flange portion 21.

As shown in FIG. 4, a plurality of mounting portions 22 for mounting the conducting terminal portions 60, which will be mentioned later, are formed in the conductive connecting member 20. Hereinafter, a case in which mounting portions 22 are formed at three places will be explained. The mounting portions 22 at the three places are referred to as "first mounting portion 22a, the second mounting portion 22b, and the third mounting portion 22c". Holes via which screws are respectively inserted are formed in the first mounting portion 22a, the second mounting portion 22b, and the third mounting portion 22c.

The conducting terminal portions 60 are disk-shaped conductive parts. The conducting terminal portions 60 are comprised of, for example, stainless steel. The conducting terminal portions 60 are mounted to the mounting portions 22 of the conductive connecting member 20 by, for example, screw fastening. The conducting terminal portions 60 and the conductive connecting member 20 are in contact with each other, and they are electrically connected.

Hereinafter, the conducting terminal portion 60 mounted to the first mounting portion 22a is referred to as "first conducting terminal portion 60a". Similarly, the conducting terminal portion 60 mounted to the second mounting portion 22b is referred to as "second conducting terminal portion 60b". Similarly, the conducting terminal portion 60 mounted to the third mounting portion 22c is referred to as "third conducting terminal portion 60c". Holes via which screws are respectively inserted are formed in the first conducting terminal portion 60a, the second conducting terminal portion 60b, and the third conducting terminal portion 60c.

The first conducting terminal portion 60a, the second conducting terminal portion 60b, and the third conducting terminal portion 60c differ in their diameters and in the areas of their surfaces in contact with the concave groove (hereinafter referred to as "contact surfaces").

For example, the diameter $\phi$ of the first conducting terminal portion 60a is 9 mm, and the area of the contact surface of the first conducting terminal portion 60a is the largest.

For example, the diameter $\phi$ of the second conducting terminal portion 60b is 6 mm, and the area of the contact surface of the second conducting terminal portion 60b is smaller than that of the first conducting terminal portion 60a.

For example, the diameter $\phi$ of the third conducting terminal portion 60c is 3 mm, and the area of the contact surface of the third conducting terminal portion 60c is smaller than that of the second conducting terminal portion 60b.

Figure 5:
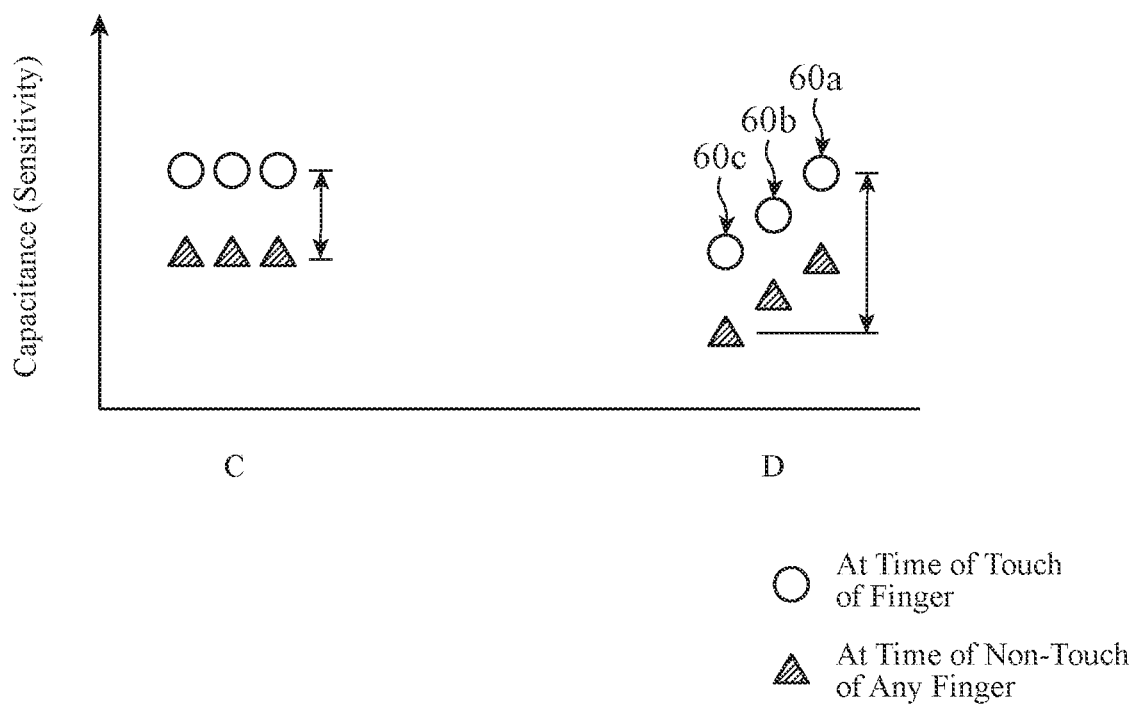
FIG. 5 is a graph for explaining a change of the capacitance detected by a touch panel.

FIG. 5 is a graph for explaining a change in the capacitance detected by the touch panel 111.

FIG. 5 shows the capacitance detected by the touch panel 111 when no finger touches the operation portion 10 (at the time of non-touch of any finger), and the capacitance detected by the touch panel 111 when a finger touches the operation portion 10 (at the time of a touch of a finger) for each of the conducting terminal portions.

A left-hand side (hereinafter referred to as "C") of FIG. 5 shows a case in which three conducting terminal portions whose areas of their contact surfaces in contact with the concave groove 51 are the same are used. On the other hand, a right-hand side (hereinafter referred to as "D") of FIG. 5 shows a case in which the conducting terminal portions 60 according to this the embodiment 1 (the first conducting terminal portion 60a, the second conducting terminal portion 60b, and the third conducting terminal portion 60c) are used.

In the case of "C", the capacitances detected at the conducting terminal portions by the touch panel 111 at the time of non-touch of any finger are the same as each other, and the capacitances detected at the conducting terminal portions by the touch panel 111 at the time of a touch of a finger are the same as each other.

In the case of "D", the capacitances detected at the first to third conducting terminal portions 60a, 60b, and 60c by the touch panel 111 at the time of non-touch of any finger differs from each other, and the third conducting terminal portion 60c, and the capacitances detected at the first to third conducting terminal portions 60a, 60b, and 60c by the touch panel 111 at the time of a touch of a finger differs from each other.

The capacitance detected at the third conducting terminal portion 60c by the touch panel 111 at the time of non-touch of any finger is relatively small compared with the capacitances detected at the first and second conducting terminal portions 60a and 60b by the touch panel 111 at the time of non-touch of any finger.

Further, the capacitance detected at the first conducting terminal portion 60a by the touch panel 111 at the time of a touch of a finger is relatively large compared with the capacitances detected at the second and third conducting terminal portions 60b and 60c by the touch panel 111 at the time of a touch of a finger.

As mentioned above, in the case of "D", the difference (the amount of change in the capacitance) between the capacitance detected at the third conducting terminal portion 60c by the touch panel 111 at the time of non-touch of any finger and the capacitance detected at the first conducting terminal portion 60a by the touch panel 111 at the time of a touch of a finger is large. As a result, the accuracy with which to detect a touch of a finger on the operation portion 10 can be improved as compared with the case of "C".

In the above explanation, the case in which the first conducting terminal portion 60a, the second conducting terminal portion 60b, and the third conducting terminal portion 60c are constructed so as to differ from one another in the areas of their contact surfaces in contact with the concave groove 51 is explained.

However, it is not limited to this case, and only one conducting terminal portion 60 (e.g., the first conducting terminal portion 60*a*) may differ from the other conducting terminal portions in the areas of their contact surfaces, and the two remaining conducting terminal portions 60 (e.g., the second conducting terminal portion 60*b* and the third conducting terminal portion 60*c*) may be identical in the areas of their contact surfaces.

Further, two conducting terminal portions 60 may be included, and the two conducting terminal portions 60 may be constructed in such a way that the areas of their contact surfaces differ.

Further, four or more conducting terminal portions 60 may be included, and at least two of the four or more conducting terminal portions 60 may be constructed in such a way that the areas of their contact surfaces differ from each other.

As shown in FIG. 2, the rotary member 40 is a ring-shaped part. The rotary member 40 is comprised of a non-conductive material.

For example, the rotary member 40 is comprised of a resin such as ABS. The rotary member 40 is rotatably supported by the rotary supporting member 50. A plurality of rotary member flange portions 41 are formed in the rotary member 40. Each rotary member flange portion 41 has a shape projecting outwardly in a radial direction. The rotary member flange portions 41 are formed at positions opposite to the conductive connecting member flange portions 21. A hole via which a screw is inserted is formed in each rotary member flange portion 41.

The mounting of the conductive connecting member 20 and the rotary member 40 to the operation portion 10 is implemented via the conductive connecting member flange portions 21 and the rotary member flange portions 41. The mounting is, for example, screw fastening. The conductive connecting member 20 and the operation portion 10 are in contact with each other and are electrically connected. Further, the conductive connecting member 20 and the rotary member 40 rotate integrally with the operation portion 10. At this time, the conducting terminal portions 60 mounted to the conductive connecting member 20 slide inside the concave groove 51 in the rotary supporting member 50.

As shown in FIG. 4, the first mounting portion 22*a*, the second mounting portion 22*b*, and the third mounting portion 22*c* have shapes projecting inwardly in a radial direction. The first mounting portion 22*a*, the second mounting portion 22*b*, and the third mounting portion 22*c* can become elastically deformed toward a direction perpendicular to the surface of the touch panel 111.

The first mounting portion 22*a* presses the first conducting terminal portion 60*a* to the surface of the touch panel 111. Similarly, the second mounting portion 22*b* presses the second conducting terminal portion 60*b* to the surface of the touch panel 111. Similarly, the third mounting portion 22*c* presses the third conducting terminal portion 60*c* to the surface of the touch panel 111. As a result, the first conducting terminal portion 60*a*, the second conducting terminal portion 60*b*, and the third conducting terminal portion 60*c* can be prevented from floating from the bottom surface of the concave groove 51, and the detection of a touch of a finger and the detection of the positions of the conducting terminal portions 60 are stabilized.

When a finger touches the operation portion 10, current flows along a path shown by an arrow Z shown in FIG. 3.

Since the rotary supporting member 50 is a non-conductive member, but the bottom surface of the concave groove 51 has a thin thickness, a change of the capacitance occurs in the touch panel 111 because of the current. The touch panel 111 detects a touch of a finger and detects the positions of the conducting terminal portions 60 on the basis of the change of the capacitance.

As shown in FIG. 4, a plurality of contact portions 23 in contact with the second wall portion 53 in the rotary supporting member 50 are formed in the conductive connecting member 20. Hereinafter, it is assumed that contact portions 23 are formed at three places, and the contact portions 23 at the three places are referred to as "first contact portion 23*a*", the second contact portion 23*b*, and the third contact portion 23*c*. The first contact portion 23*a*, the second contact portion 23*b*, and the third contact portion 23*c* have shapes projecting toward the touch panel 111, and they can become elastically deformed in a radial direction.

The first contact portion 23*a*, the second contact portion 23*b*, and the third contact portion 23*c* apply a force in a direction toward the center of rotation to the second wall portion 53 in the rotary supporting member 50. By constructing the contact portions in this way, a frictional force occurs between the conductive connecting member 20 and the rotary supporting member 50 as the operation portion 10 rotates. By adjusting the magnitude of the frictional force, the feeling of operating the knob 120 can be adjusted.

As mentioned above, the knob 120 according to the embodiment 1 includes: the operation portion 10 comprised of a ring-shaped conductive material, a rotational operation being performed on the operation portion; the rotary supporting member 50 comprised of a ring-shaped non-conductive material and fixed onto the capacitive type touch panel 111, for rotatably supporting the operation portion 10; the ring-shaped concave groove 51 disposed in the rotary supporting member 50; and the conductive conducting terminal portion 60 electrically connected to the operation portion 10 and rotating inside the concave groove 51 integrally with the operation portion 10, the position of the conducting terminal portion being detected by the touch panel 111, and the conducting terminal portion 60 is comprised of a plurality of conducting terminal portions, and at least two of the conducting terminal portions 60 differ from each other in areas of their surfaces in contact with the concave groove 51. Therefore, the occurrence of non-detection and erroneous detection of a touch of a finger on the knob can be prevented.

It is to be understood that changes can be made in an arbitrary component according to the embodiment, and an arbitrary component can be omitted in the embodiment within the scope of the present invention.

INDUSTRIAL APPLICABILITY

Since the knob according to the present invention can prevent the occurrence of non-detection and erroneous detection of a touch of a finger on the knob, the knob is suitable for being mounted in a display mounted and equipped with a capacitive type touch panel in a vehicle.

REFERENCE SIGNS LIST

10: operation portion,
20: conductive connecting member,
21: conductive connecting member flange portion,
22: mounting portion,
22*a*: first mounting portion,
22*b*: second mounting portion, 22c: third mounting portion,
23: contact portion,
23a: first contact portion,
23b: second contact portion,
23c: third contact portion,
40: rotary member,
41: rotary member flange portion,
50: rotary supporting member,
51: concave groove,
52: first wall portion,
53: second wall portion,
60: conducting terminal portion,
60a: first conducting terminal portion,
60b: second conducting terminal portion,
60c: third conducting terminal portion,
100: input device,
110: touch panel-equipped display,
111: touch panel,
112: display, and
120: knob.

The invention claimed is:

1. A knob comprising:
a ring-shaped operation member comprised of conductive material, a rotational operation being performed on the operation member;
a ring-shaped rotary supporting member comprised of non-conductive material, formed with a ring-shaped concave groove, and fixed onto a capacitive type touch panel, the rotary supporting member rotatably supporting the operation member; and
a plurality of conductive conducting terminal members electrically connected to the operation member, the plurality of conductive conducting terminal members being rotated inside the concave groove with the operation member, each position of the plurality of conductive conducting terminal members being detected by the touch panel,
wherein at least two of the plurality of conductive conducting terminal members differ from each other in areas of their surfaces in contact with the concave groove.

2. The knob according to claim 1, further
a conductive connecting member electrically connected to the operation member and rotating integrally with the operation member,
wherein the conductive connecting member presses the plurality of conductive conducting terminal members against the concave groove, and also applies force toward a direction toward a center of rotation to the rotary supporting member.

3. An input device comprising:
the knob according to claim 1;
a capacitive type touch panel to which the knob is fixed; and
a display integral with the touch panel, the display displaying information.

4. An input device comprising:
the knob according to claim 2;
a capacitive type touch panel to which the knob is fixed; and
a display integral with the touch panel, the display displaying information.

* * * * *